(No Model.)
C. SCHULTZ.
Machine for Dressing Hides.
No. 241,073. Patented May 3, 1881.
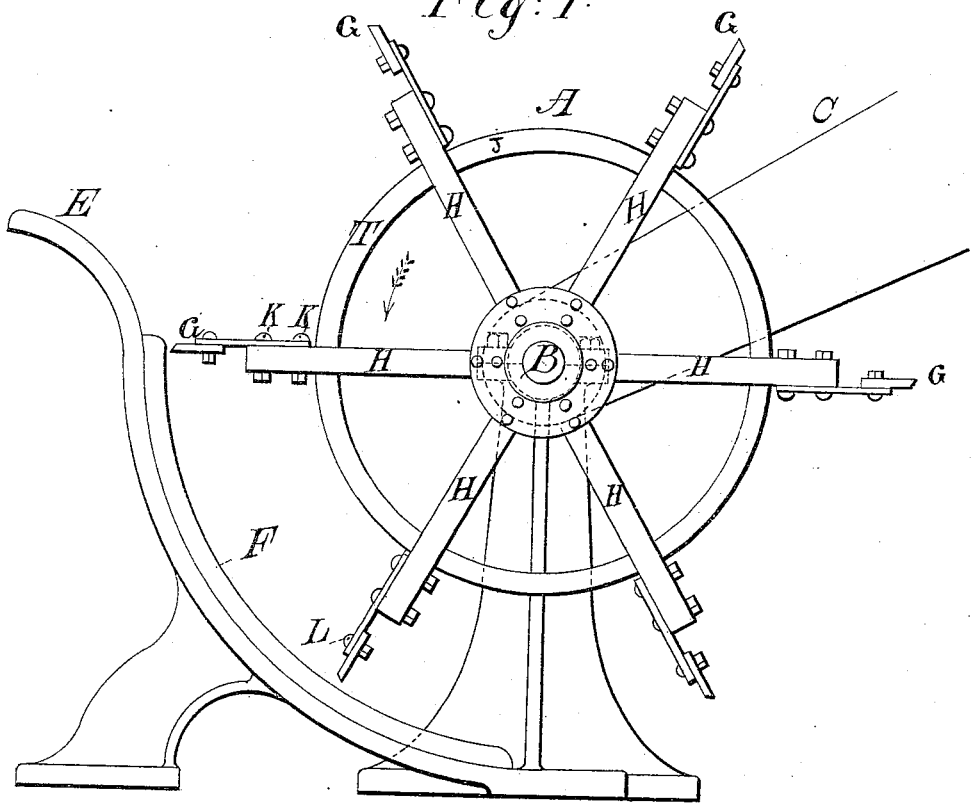
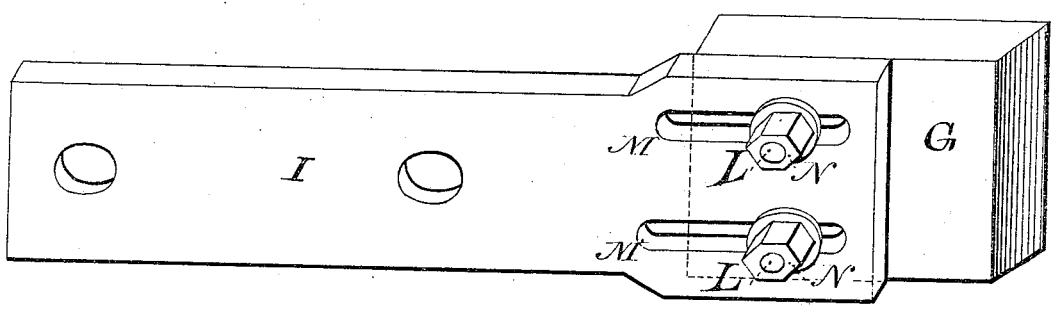
WITNESSES:
O. R. Erwin
H. E. Swain.
INVENTOR
Charles Schultz
BY Jas. B. Erwin
ATTORNEY

UNITED STATES PATENT OFFICE.

CHARLES SCHULTZ, OF MILWAUKEE, WISCONSIN, ASSIGNOR OF ONE-HALF TO WILLIAM C. J. BECKER, OF SAME PLACE.

MACHINE FOR DRESSING HIDES.

SPECIFICATION forming part of Letters Patent No. 241,073, dated May 3, 1881.

Application filed March 7, 1881. (No model.)

*To all whom it may concern:*

Be it known that I, CHARLES SCHULTZ, a citizen of the United States, residing at the city and county of Milwaukee, in the State of Wisconsin, have invented certain new and useful Improvements in Machines for Scraping Hides; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of my invention is to provide a device for scraping the refuse matter from hides which have previously been soaked preparatory to tanning them, which device is further explained by reference to the accompanying drawings.

Figure 1 represents a side view of my invention. Fig. 2 is a perspective view of the scraping blade and shank detached from the actuating mechanism.

Like parts are represented by the same reference-letters.

The scraping device shown in Fig. 2, consisting in blade G and shank I, is operated by the wheel A, which wheel is mounted upon shaft B, and is driven in the direction indicated by the arrow by band C. The arms H of the wheel extend past the periphery or rim J of the wheel, and afford a place of attachment for the shank I, which shank is secured thereto by bolts K K. The blade G is attached to the shank I with bolts L L, which bolts are rigidly attached at one end to the blade, while their opposite ends operate loosely in slots M M and are provided with nuts N N, whereby the blades G may be readily moved and adjusted, as desired.

E is a scraping board or table, upon which the hides are supported while being scraped.

F is a narrow movable block, the front surface of which is curved to conform to the line of the circle described by the edge of the scraping-blade G. Thus when the hides are thrown upon the table E, across the block F, they are readily moved forward and retained in their proper relative position to the blades by moving forward the block F, when the blades G are, one after another, brought in contact with that portion of the hide which rests upon the curved surface of the block, and the hide is gradually drawn across the block until all refuse matter is removed. As the blades G become worn away they may, by loosening the nuts N, be readjusted farther forward, from time to time, until the greater part of the blade is worn away.

Having thus described my invention, what I claim as new, and desire to secure by Letters Patent, is—

1. In machines for dressing hides, the scraping device herein described, consisting of the shank I, provided with slots M M, and blade G, having fixed bolts L L, provided with nuts N N, as adapted to secure the blade to the shank at any desired point of adjustment, substantially as and for the purpose specified.

2. In machines for dressing hides, the combination of wheel A, provided with arms H, extending past the periphery of the wheel, with the scraping device consisting of shank I and adjustable blade G, said shank being secured to the projecting ends of arms H by bolts K K, all substantially as and for the purpose set forth.

In testimony whereof I affix my signature in presence of two witnesses.

CHARLES SCHULTZ.

Witnesses:
JAS. B. ERWIN,
H. E. SWAIN.